(12) United States Patent
Medford et al.

(10) Patent No.: US 6,523,275 B2
(45) Date of Patent: Feb. 25, 2003

(54) ROOFING LAYOUT TAPE AND METHOD OF USE

(76) Inventors: Kevin S. Medford, 328 9th St., Belle, WV (US) 25015; Cindy Medford, 328 9th St., Belle, WV (US) 25015

( * ) Notice: Subject to any disclaimer, the term of this patent is extended or adjusted under 35 U.S.C. 154(b) by 38 days.

(21) Appl. No.: 09/828,932

(22) Filed: Apr. 10, 2001

(65) Prior Publication Data

US 2001/0034954 A1 Nov. 1, 2001

Related U.S. Application Data

(60) Provisional application No. 60/196,481, filed on Apr. 12, 2000.

(51) Int. Cl.[7] .................................................. G01B 3/10
(52) U.S. Cl. .............................. 33/759; 33/494; 33/648
(58) Field of Search ........................ 33/759, 494, 483, 33/646, 647, 648, 649, 679.1, 755, 758

(56) References Cited

U.S. PATENT DOCUMENTS

| | | | | |
|---|---|---|---|---|
| 184,537 A | * | 11/1876 | May ............................ | 33/759 |
| 674,756 A | | 5/1901 | Casebolt | |
| 4,149,320 A | | 4/1979 | Troyer et al. | |
| 4,301,596 A | | 11/1981 | Sedlock | |
| 4,679,325 A | | 7/1987 | Sweatman | |
| 5,012,590 A | * | 5/1991 | Wagner et al. ................. | 33/494 |
| 5,018,279 A | | 5/1991 | Williams | |
| 5,056,234 A | | 10/1991 | Han | |
| 5,230,158 A | | 7/1993 | Wall | |
| 5,487,223 A | * | 1/1996 | Krane ......................... | 33/483 |
| 5,546,671 A | | 8/1996 | Kehoe | |
| 5,666,737 A | * | 9/1997 | Ryan, III ..................... | 33/494 |
| 5,724,747 A | | 3/1998 | Poorman | |
| 5,875,557 A | * | 3/1999 | Ueki ........................... | 33/476 |
| 5,913,586 A | * | 6/1999 | Marshall ...................... | 33/494 |
| 5,918,439 A | | 7/1999 | Metzer et al. | |
| RE37,212 E | * | 6/2001 | Marshall ...................... | 33/494 |

FOREIGN PATENT DOCUMENTS

FR   888466   2/1963

* cited by examiner

Primary Examiner—Diego Gutierrez
Assistant Examiner—Yaritza Guadalupe
(74) Attorney, Agent, or Firm—Richard C. Litman

(57) ABSTRACT

A roofing layout tape is calibrated to show the linear increments between rows or courses of shingles, and also the incremental bond line markings applied from the lateral eaves of a roof to provide shingle overhang for runoff at the eaves and lateral stagger for each horizontal course of shingles. The device comprises a flexible tape retractably housed within a case or reel. While the present roofing layout tape may include conventional linear markings (inches, feet, etc.), it also includes a series of course and bond line markings along each edge of the top surface (i.e., the inwardly disposed surface when the tape is coiled). One set of edge markings applies to conventional or three tab shingles, while the opposite edge markings apply to dimensional or architectural shingles. A method of using the present roofing layout tape for laying out shingle course lines and bond lines, is also disclosed.

19 Claims, 10 Drawing Sheets

ROOFING LAYOUT TAPE AND METHOD OF USE

CROSS-REFERENCE TO RELATED APPLICATION

This application claims the benefit of U.S. Provisional Patent Application Ser. No. 60/196,481, filed Apr. 12, 2000.

BACKGROUND OF THE INVENTION

1. Field of the Invention

The present invention relates generally to retractable measuring tapes, and more specifically to a roofing layout tape having dedicated indicators thereon and a method for precisely laying out dimensional and conventional shingles on a roof without requiring calculation or excessive manipulations by the user.

2. Description of Related Art

Innumerable devices and scales for linear measurement have been developed in the past, from the earliest standardization of various linear quantities. Most such linear measuring devices generally comprise an elongate ruler or tape, marked off in evenly divided increments for measuring a given length or distance (feet and inches, metric, etc.). More recently, specialized devices have been developed to indicate certain standardized increments in various fields, e.g., a scale having a series of divisions indicating the standard spacing for wall stud construction.

Conventionally, roofing shingle layout work has been accomplished using a conventional steel measuring tape, which requires relatively cumbersome calculation of each incremental course line due to the fractions of inches generally involved. Certain fixtures have been developed in the past, but these devices are physically cumbersome and inconvenient to use.

Accordingly, a need will be seen for a roofing layout tape including a series of increments thereon indicating the proper spacing and bond lines for both conventional and architectural shingles. The present invention eliminates the need for cumbersome calculation heretofore required for such work. A method of using the present invention is also disclosed. A discussion of the related art of which the present inventors are aware, and its differences from the present invention, is provided below.

U.S. Pat. No. 674,756 issued on May 21, 1901 to Joseph B. Casebolt, titled "Shingling Bracket," describes a device whereby a user may accurately predetermine the length of the portion of a shingle to be exposed to the weather. The Casebolt bracket includes two relatively movable components, which may be adjusted relative to one another to align an upright edge for positioning against the edge of a shingle or the like. The Casebolt device is relatively short and is only usable with a single shingle or the like at a time, and cannot be extended across an entire roof for laying out a complete shingle pattern thereon, as provided by the present tool. Casebolt does not provide any specific indicators thereon for marking a roof for laying out shingles thereon.

U.S. Pat. No. 4,149,320 issued on Apr. 17, 1979 to Daniel Troyer et al., titled "Building Construction Measuring Tape," describes a single use tape having a pressure sensitive adhesive coating thereon. The Troyer et al. tape is applied to the structure (sole plate, roof ridge, etc.) to which other members (wall studs, rafters, etc.) are to be attached, with the markings of the Troyer et al. tape serving as a template for indicating the location for these components without requiring further measuring or marking of the structure. The disadvantage of the Troyer tape is that it is not reusable, with an inordinate number of such disposable tapes being required to lay out the shingle pattern for a single roof. Moreover, some form of measurement would be required in any event in order to provide accurate alignment parallel and perpendicular to the edges of the roof if the Troyer tape were to be used on a plane surface.

U.S. Pat. No. 4,301,596 issued on Nov. 24, 1981 to Thomas Sedlock, titled "Stud Tape Measure," describes a tape having conventional inch and foot markings thereon, with sixteen inch spacing for additional markings to indicate the positioning of wall studs on top and bottom plates. Two scales are provided, with the scales being staggered slightly (¾ inch) for use in measuring the location of the edge or the center of the stud array. The Sedlock tape does not provide two different scales thereon for laying out different spacing for differently dimensioned materials (e.g., the length and width of shingles), but rather provides two staggered scales having the same incremental markings thereon.

U.S. Pat. No. 4,679,325 issued on Jul. 14, 1987 to Bobby Sweatman, titled "Chalk Line Marking Device," describes a retractable tape primarily formed of a slick plastic or other material which does not pick up chalk. The tape may have a series of perforations therethrough, exposing chalk receptive material (cloth, etc.) therein, or spots of chalk receptive material thereon. The case in which the tape is stored contains chalk, with chalk being applied to the chalk receptive areas of the tape as it is pulled from its case. The tape is then used as a chalk line to mark the areas corresponding to the chalked portions of the tape. Only one series of marker spacing may be applied to each side or surface of the tape, as any attempt to include additional series on a single side or surface would result in confusingly marked plural markings being deposited.

U.S. Pat. No. 5,018,279 issued on May 28, 1991 to Clarence F. Williams, titled "Strip Shingle Alignment Tool," describes a tool comprising an elongate alignment edge with a pair of spaced apart clamps extending therefrom. The clamps are secured to the lower edges of the uppermost secured course of shingles, with the straightedge defining an abutment for the lower edges of the next higher course of shingles, for positioning those shingles. The clamps of the Williams tool more closely resemble the shingling bracket of the Casebolt '758 U.S. Patent discussed further above, than any aspect of the present invention. Williams does not disclose any form of incrementally marked gauge or measure, as provided by the present roofing layout tape invention.

U.S. Pat. No. 5,056,234 issued on Oct. 15, 1991 to Curtis Han, titled "Roofing Tile Course Marking Device," describes a retractable tape for use in laying out courses for the installation of roofing tile of various sizes and compositions produced by various manufacturers. The tape has a plurality of series of coded marks inscribed thereon which can be used in laying out each course of tile produced by a corresponding number of differently dimensioned tiles, as produced by different manufacturers. The layout codes comprise a series of lines disposed transversely across the tape, with each different type of tile being designated by a different color, number, etc. The present roofing layout tape differs in that (a) it includes two parallel scales on opposite edges of one of the tape surfaces, and (b) the two scales provide two different measurements which are critical to the layout of flat shingles, which measurements are not provided by the Han tape.

U.S. Pat. No. 5,230,158 issued on Jul. 27, 1993 to Edward M. Wall, titled "Measuring Tape," describes a tape measure having a single true scale and a series of proportional scales therewith. The proportional scales provide measurements to allow for the additional length of sloped common, hip, and valley rafters relative to their horizontal runs, for constructing sloped roofs. The Wall tape is directed only to the linear relationships between various types of rafters and their horizontal runs for a single specific roof slope. No indicators are provided for laying out the spacing and bonding stagger for different types of shingles to be applied to a roof, as accomplished by the present invention.

U.S. Pat. No. 5,546,671 issued on Aug. 20, 1996 to Ted P. Kehoe, titled "Multi-Purpose Roofing Tool Kit," describes a set of cooperating tools to assist a roofer in the tasks involved in covering a roof surface with shingles or tiles, and other chores associated with wall and roof construction, projection, and maintenance. The set includes various tools and equipment that can be synergistically combined to accurately and safely measure, cut and install shingles or tiles while standing on a slanted roof surface under precarious conditions. While at least two linear measurement scales are provided with the Kehoe kit, neither comprises an elongate scale which may be used to span a roof in either dimension, as provided by the present roofing layout tape.

U.S. Pat. No. 5,724,747 issued on Mar. 10, 1998 to Jeffrey Poorman, titled "Brick Mason's Spacing Tape," describes a retractable measuring tape adapted for use in laying bricks. The tape has a first edge and a second edge, with the first edge being marked conventionally in inches and feet. The second edge includes a series of marks thereon, spaced at one eighth or one sixteenth of an inch apart. These marks are used for precisely aligning courses or bond lines of bricks when the tape is placed vertically or horizontally along a wall during construction. The Poorman mason's tape is not calibrated for use in shingle layout on a roof, and cannot directly establish shingle row lines, bond lines, and/or overhang allowance lines on a roofing surface, as provided by the present roofing layout tape invention.

U.S. Pat. No. 5,918,439 issued on Jul. 6, 1999 to John A. Metzer et al., titled "Roof Shingle Replacement Tool And Method," describes an apparatus more particularly adapted for the alignment of new shingles being laid over an entire roof panel, rather than for replacing shingles, as indicated by the title of the document. The Metzer et al. assembly comprises a pair of indexing arms which are adjustably secured to points relatively high up the slope of the roof, with their lower ends having a support member extending thereacross. The support member defines the lower edge of each course of shingles laid on the roof, and is sequentially raised to the next succeeding position across the indexing arms for each shingle course. The Metzer et al. device is relatively cumbersome in comparison to the present invention, and does nothing to establish bond lines or eaves overhang distances in shingling a roof, as provided by the present roofing layout tool invention.

Finally, French Patent Publication No. 888,466 published on Feb. 25, 1963, illustrates a reinforced measuring tape having a series of apparently transparent plastic coatings thereon. No scales, either single or double, for laying out shingle course and bond lines on a roof surface, is apparent in the '466 French Patent Publication drawing Figure.

None of the above inventions and patents, taken either singly or in combination, is seen to describe the instant invention as claimed.

SUMMARY OF THE INVENTION

The present invention provides a roofing layout tape and method of use of the tape for laying shingles for the most common types of roofing shingles, i.e., conventional and dimensional shingles. Conventional shingles, otherwise known as traditional or 3-tab shingles, are the classic shingles commonly observed on homes throughout the United States. Dimensional or architectural shingles are similar to conventional shingles in shape and form but are generally heavier and larger, may be made without integral tabs, and have greater design or aesthetic flexibility. According to the present invention, the roofer uses the present tape as a guide for laying out a grid for precise alignment and placement of either conventional or dimensional shingles on a roof. This provides a significant improvement over the prior art in terms of the ease and simplicity with which shingling may be accomplished.

The present roofing tape apparatus comprises a flexible linear measuring tape which is extendibly coiled within a housing. Inscribed on the first face of the tape (i.e., inwardly disposed face, when the tape is coiled) are two groups of linear measurement indicators, with one group indicating the course and bond layouts for conventional shingles and the other group indicating the corresponding layouts for dimensional or architectural shingles. Each group of indicators extends along one of the two edges of the tape and comprises two series of increments, i.e., a horizontal course line series and a vertical bond line series.

These two incremental series are used respectively for marking a plurality of lines forming a grid comprising a substantially horizontal series of shingle course lines for aligning the upper and lower edges of the shingles, and a substantially vertical series (i.e, up the slope of the roof) of shingle bond lines for aligning the lateral edges of the shingles relative to the lateral edges of the roof, to provide a suitable drip overhang at the eaves and proper lateral overlap of each successive shingle course.

The present disclosure also describes a method for using the present roofing layout tape. The method generally comprises the steps of a) preparing the roof for new shingles, b) laying out the grid for new shingles by means of the present layout tape, c) attaching shingles according to the grid pattern, d) adjusting for the drip edge and shingles (if necessary); and e) removing extraneous materials.

Accordingly, it is a principal object of the invention to provide a roofing layout tape for laying out shingle course and bond lines forming a grid for precise placement of either conventional or dimensional shingles on a roof.

It is another object of the invention to provide a method of using the present roofing layout tape for laying out shingle course and bond lines upon a roof surface.

Still another object of the invention is to provide a roofing tape and method for laying shingles which allows for shingling a roof without requiring calculation or excessive manipulations by the roofer.

It is a further object of the invention to provide a roofing layout tape having shingle course and bond line markings for both conventional and dimensional shingles upon a single surface of the tape, with the two series disposed to opposite edges of the tape.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
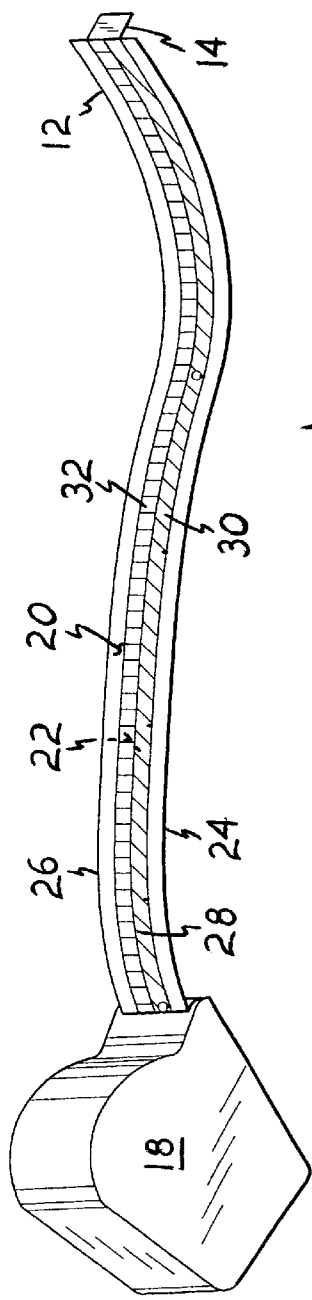
FIG. 1 is a perspective view of the present roofing layout tape partially extended from its case or reel.

The present invention relates to a roofing layout tape and method of use of the tape in laying out a pattern on a roof for the accurate alignment of shingles installed on the roof. The preferred embodiment of the present roofing layout tape invention is shown in detail in FIGS. 1 and 2, and is designated by the reference numeral 10 throughout the drawings. The present roofing layout tape 10 is preferably housed within a case 12 having a conventional retraction spring mechanism for coiling the tape 10 within the case 12 when the tape 10 is not in use. Other storage means and tape configurations may be provided in keeping with the present tape 10 invention, so long as the layout markings provided on such a tape fall within the scope of the present invention.

The tape 10 essentially comprises an elongate, thin, flexible strip of material (flexible steel, plastic, or even a woven fabric material, etc., as desired) having a first or origin end 12 from which a tape end grip or hook 14 extends, for capturing or anchoring the first end 12 of the tape 10 upon a convenient structure (lower eaves or ridge of a roof, etc.). The opposite second end 16 of the tape strip 10 (shown generally in FIGS. 4 through 6, in which the tape 10 is fully extended) is normally retracted within a case 18 by means of a conventional retraction spring (not shown) when the tape 10 is not in use.

The tape 10 includes a first surface 20, i.e., the surface of the tape which faces inwardly when the tape 10 is retracted and coiled within the case 18 and which is exposed upwardly, i.e., away from the orientation of the catch or hook 14 when the tape 10 is extended from its case 18. The first surface 20 includes layout markings thereon for marking the appropriate dimensional markings upon a roof surface for the layout of various types of shingles, as discussed further below. The opposite second surface 22 of the tape 10 is unmarked. The relatively flat and thin tape strip 10 also includes a first edge 24 and an opposite second edge 26, with markings for a different type of shingle layouts being provided adjacent each of the edges 24 and 26. The two marking series are separated by a division line 28 which extends the entire length of the tape 10, and is centered along the first surface 20 thereof.

A first side 30 comprising a series of layout markings is provided on the first surface 20 of the tape 10, generally adjacent or facing the first edge 20 of the tape 10, with a second side 32 comprising a second series of layout markings being provided facing the opposite second edge of the tape 10. These two layout marking series 30 and 32 extend continuously from the first end 12 to the second end 16 of the tape 10. The first marking series provides for the accurate layout of a pattern for placement of conventional or three tab type shingles, while the opposite second side or series of markings is adapted for the layout of a pattern for the installation of dimensional or architectural shingles, which differ dimensionally and in other respects from the conventional shingles.

A discussion of the two above noted types of shingles is in order at this point. Conventional shingles are used for most roofing work on sloped roofs, and have dimensions of about twelve by thirty six inches, or one by three feet. This type of shingle is also known as a "three tab" shingle, due to the two rain grooves conventionally formed in one edge thereof and extending about halfway across the width of the shingle, which divide the grooved side into three separate tabs. These shingles are generally applied to a roof with about a seven inch overlap, or in other words, each horizontal row or course of shingles is displaced about five inches up the slope of the roof from the preceding course.

Dimensional or architectural shingles are generally configured with fractional foot and inch dimensions, e.g., about 38¾ inches long by 13¼ inches wide; these dimensions will vary is slightly, depending upon the manufacturer of the shingles. Dimensional or architectural shingles are often used where greater design flexibility is desired over that provided by conventional shingles. In the present disclosure, the markings described for the dimensional shingle layout series 32 on the tape 10 is based upon the above dimensions for dimensional shingles. It will be seen that the scales 30 and 32 of the present roofing shingle layout tape 10 may be readily modified to suit any practicable shingle dimensions, as desired.

Figure 2:
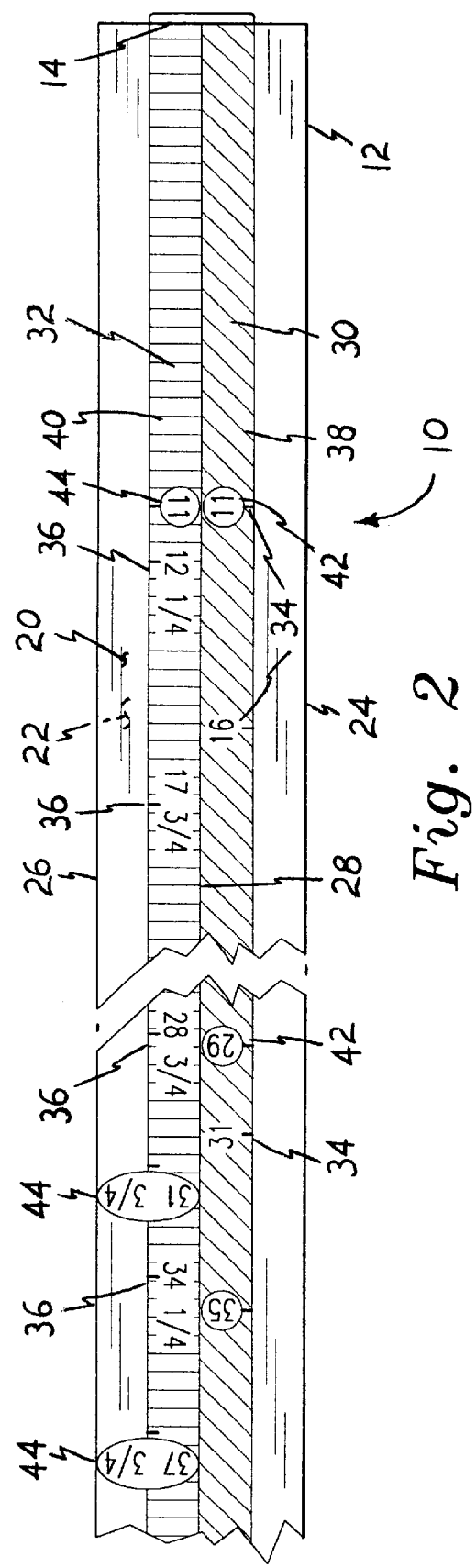
FIG. 2 is a detailed top plan view of a portion of the present roofing layout tape, illustrating the layout markings thereon.

The conventional shingle layout indicator series 30 includes a linear series of dimensional markings 34 thereon, each spaced five inches apart from one another, as shown clearly in FIG. 2 of the drawings. As conventional three tab shingles are generally installed in horizontal rows, with each row being five inches up the slope of the roof from the preceding row, it will be seen that this five inch incremental spacing of the conventional shingle markings 34 automatically provides an indication of the horizontal row or course spacing for such conventional shingles. FIGS. 3 through 10 illustrate the progressive steps in the use of the present layout tape 10 and corresponding installation of conventional shingles on a roof.

It will be understood that the procedure for installing dimensional or architectural shingles is essentially the same, with only the spacing between the dimensional shingle layout markings 36 of the second marking side 32 differing from that of the conventional shingle layout markings 34 of the first marking side 30 of the tape 10. As the width of such dimensional shingles is different from that of conventional shingles, the overlap of each course or row of dimensional shingles is also different. The dimensional shingle course or row linear markings 36 of the present layout tape 10 are spaced five and one half inches apart, i.e., 12¼, 17¾, 23¼, 28¾, 34¼, etc., to the second end 16 of the tape 10, as indicated by the dimensional shingle course markings 36 shown on the tape 10 in FIG. 2.

Preferably, these two linear series of shingle row markings 34 and 36 are further delineated from one another by contrasting colors, e.g., the first color 38 of the first marking side or series 30, indicated by the diagonal pattern on the first surface 20 of the tape 10 in FIGS. 1 and 2, and the second color 40 of the second marking side or series 32, designated by the generally vertical pattern on the first surface 20 of the tape 10. Other means (different numerical styles or fonts, different patterns, etc.) may be used to differentiate the two series 30 and 32 from one another, and/or the tape 10 may also include a conventional linear measurement scale thereon (not shown specifically, but represented by the vertical gradient of the pattern representing the second color 40 in FIGS. 1 and 2) in addition to the dedicated conventional shingle and dimensional shingle markings provided.

It is also necessary when installing shingles, to provide at least some shingle drip overhang extension at the eaves, and to stagger the shingles laterally in each successive row or course. The alignment lines applied to the underlying roof surface are known as "bonding lines," with the term originating from the overlapping configuration conventionally used in bricklaying. The present roofing layout tape 10 also preferably includes two series of bonding markings 42 and 44, respectively for laying out the bonding markings for conventional shingles and for dimensional shingles. These bonding markings 42 and 44 may be differentiated from the course layout markings or indicators 34 and 36 by some means, e.g., circling the bonding markings 42 and 44, etc.

Each series of bonding markings 42 and 44 originates eleven inches from the first end 12 of the tape 10. This first number in each bonding marking series 42 and 44, defines the alignment of the inboard edge (i.e., the edge facing toward the center of the roof) of lateral rows of shingles which are installed with their lengths aligned parallel to the two lateral, sloped eaves of the roof. While these shingle rows are not required, they serve to establish the overhang for the shingle installation and also provide a guide for trimming the excess overhang of the remaining horizontally installed shingles after the installation is complete. The remaining bond line numbers are positioned at 29 and 35 inches from the first end 12 of the tape 10 for conventional shingles, and 31¾ and 37¾ inches from the tape first end 12 for dimensional shingles. These bond line series 42 and 44 establish the "stagger" or lateral offset for the successive rows of shingles as they are progressively installed up the roof slope from the lowest eaves.

Figure 3:
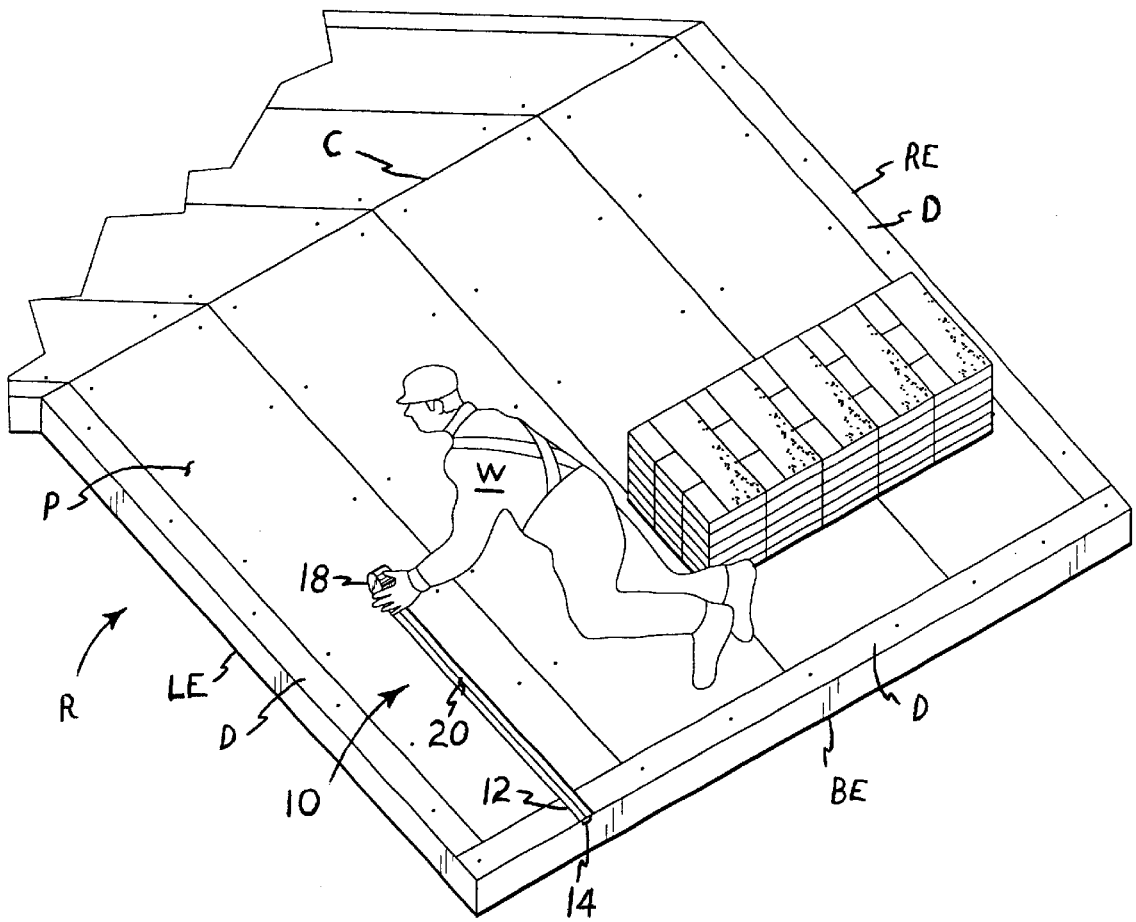
FIG. 3 is an environmental, perspective view of the present roofing layout tape, showing its extension preparatory to marking a series of shingle course line marks on the roof surface.

FIGS. 3 through 10 illustrate the progressive steps in laying out a shingle pattern and installing shingles by means of the present roofing layout tape 10. FIG. 3 provides a top perspective view of a generally rectangular roof R having a generally horizontal bottom eaves BE, with sloping left and right eaves LE and RE and a roof crest C. The roof R has been previously prepared for laying new shingles thereon, by stripping any old roofing (shingles and roofing paper) from the underlying structure in the case of an existing structure, and applying new roofing paper P and eaves drip edge D, as is conventional in the art.

Figure 10:
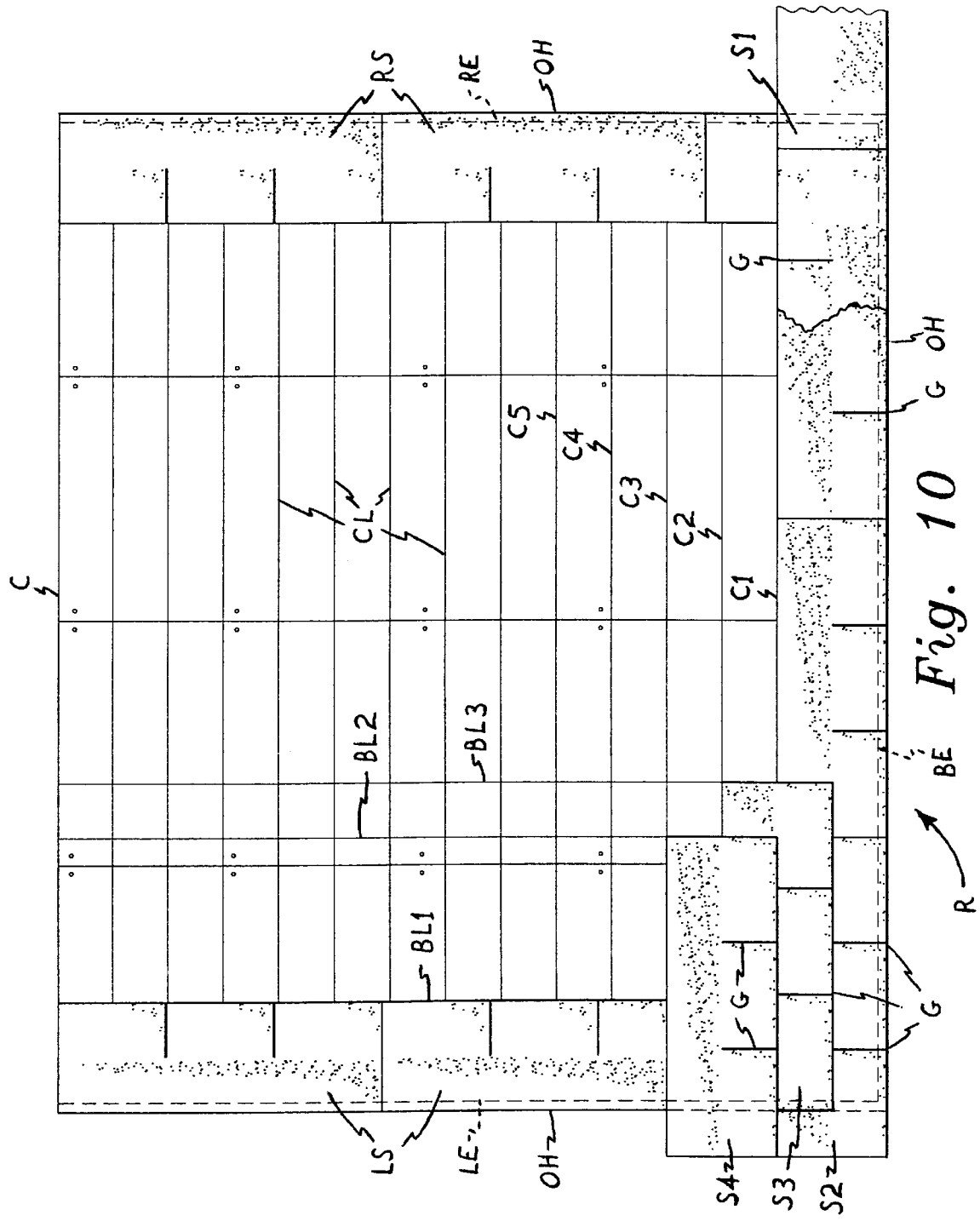
FIG. 10 is a top plan view of the roof surface of FIGS. 3 through 9, showing the completion of the starter and first shingle courses and beginning of the second and third shingle courses, aligned with the course and bond lines provided by the present roofing layout tape invention.
Figure 11:
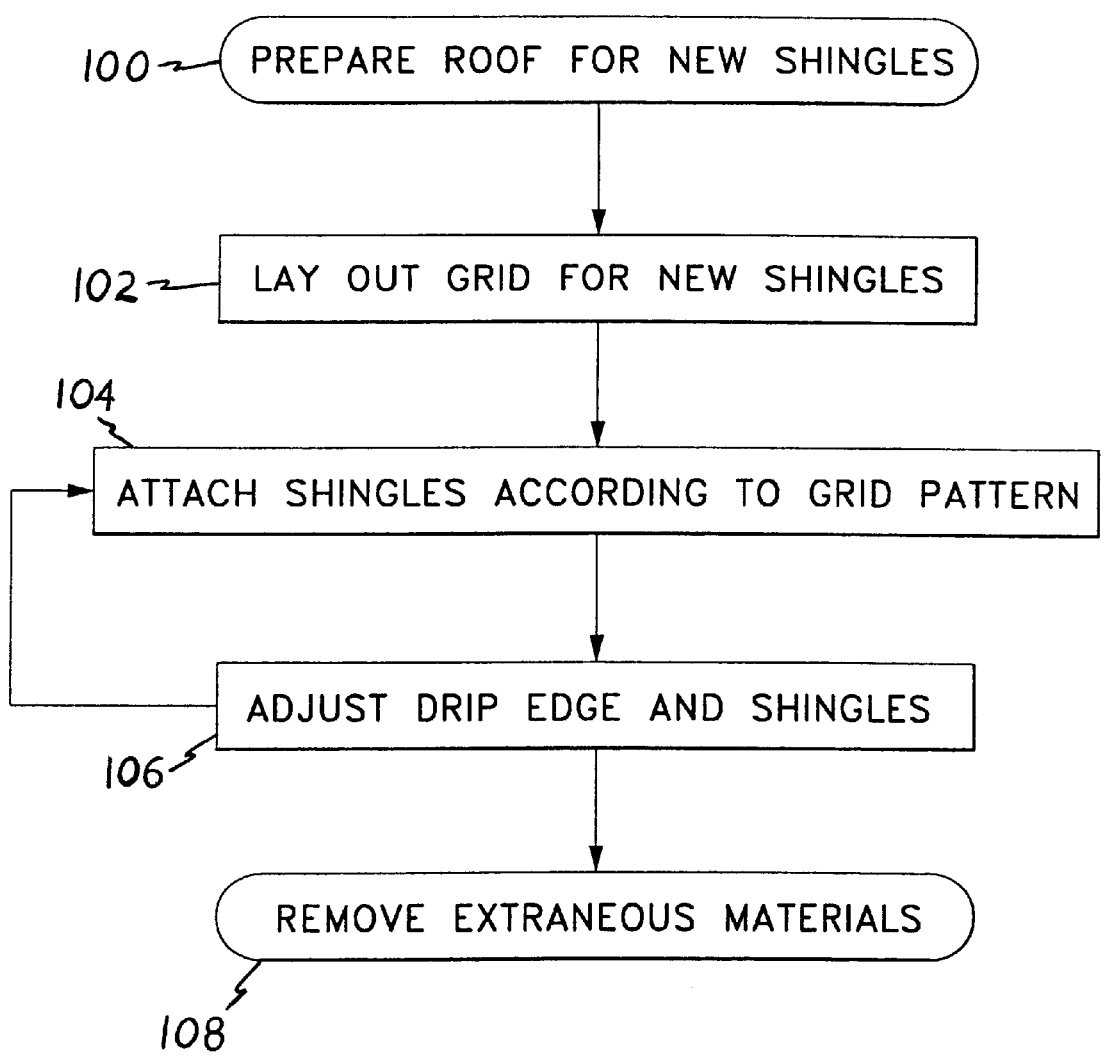
FIG. 11 is a flow chart disclosing the method of using the present roofing layout tape, according to the present invention.

FIG. 11 generally describes the various steps in the application of roofing shingles, including the step of laying out a shingle alignment grid on the roof by means of the present layout tape invention. The first step 100 of FIG. 11, i.e., "Prepare roof for new shingles," essentially covers the work described above in stripping old shingles and roofing paper (as necessary) from the roof and applying new paper and flashing. The second step 102 of FIG. 11, i.e., "Lay out grid for new shingles," is illustrated pictorially in FIGS. 3 through 8 of the drawings, with FIGS. 9 and 10 providing depictions of the remaining shingle installation procedure described in the third through fifth steps 104 through 108 of FIG. 11.

In FIG. 3, the roofing worker W has partially extended the tape 10 from the bottom eaves BE toward the roof ridge or crest C, and near one of the eaves (e.g., the left eaves LE) by hooking the grip or hook 14 extending from the first end 12 of the tape 10 on the bottom eaves drip edge D. The tape 10 may then be withdrawn from its case 18 as the worker W advances up the slope of roof R.

Figure 4:
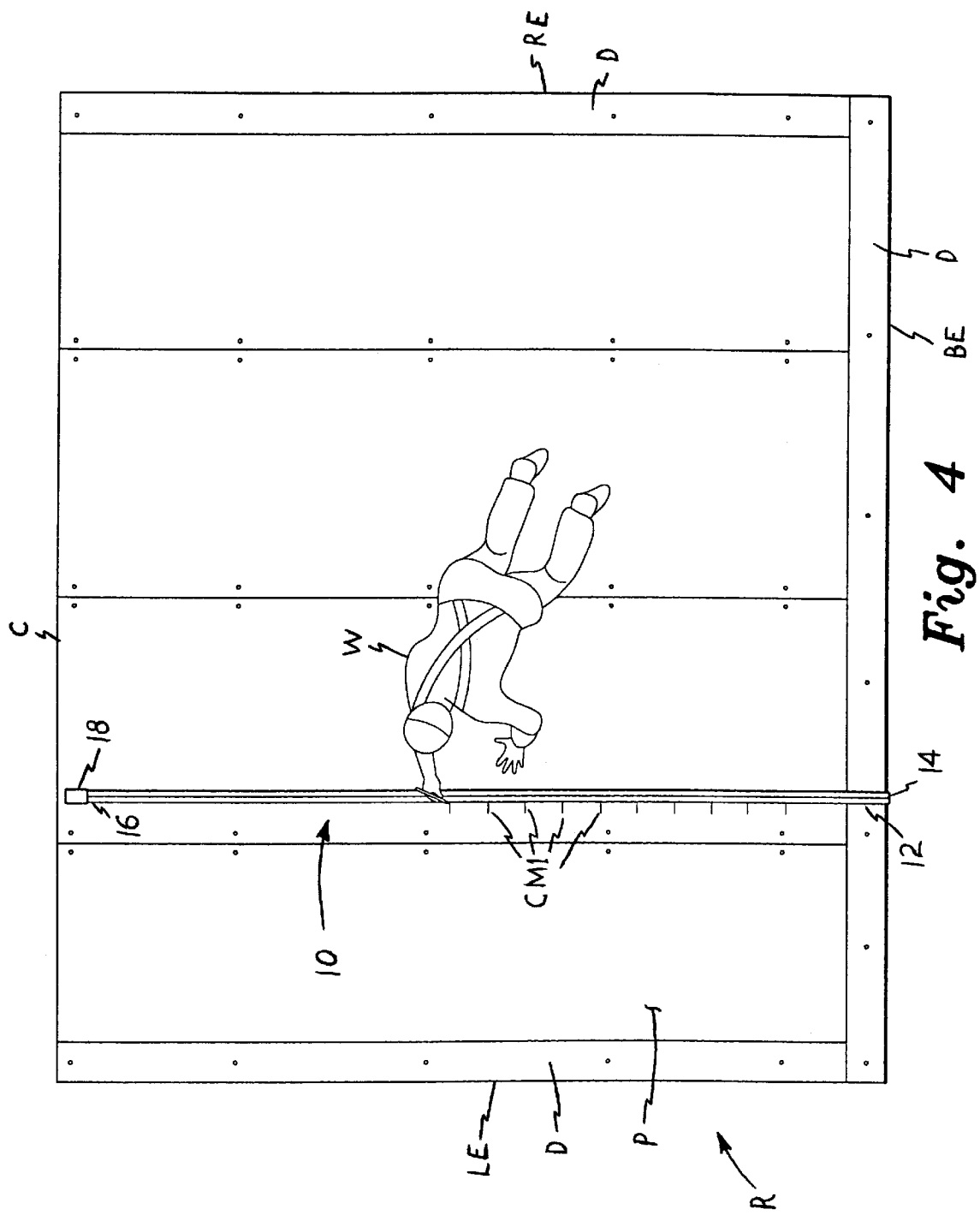
FIG. 4 is a top plan view of the roof surface of FIG. 3, showing the marking of a series of shingle course line marks thereon by means of the present roofing layout tape.

In FIG. 4, the tape 10 has been extended to a point adjacent the roof ridge or crest C, and locked to preclude retraction; such tape reel locks are conventional in retractable measuring tapes, and it will be seen that such a device may be incorporated with the roofing layout tape 10 of the present invention. The tape case 18 may be placed on the opposite side of the roof crest C, if desired, where its weight will assist in keeping the extended tape 10 in place across the surface of the roof R.

Once the tape 10 has been extended up the slope of the roof R, as shown in FIG. 4, the worker W then makes a shingle course edge mark CM1 on the surface of the roofing paper P adjacent to each of the shingle edge course marks 34 along the tape 10 (for conventional shingles; the marks 36 on the opposite side or scale 32 would be used if dimensional or architectural shingles were to be used). These marks CM1 are spaced five inches apart, beginning eleven inches up the slope of the roof R from the bottom eaves BE, i.e., 11, 16, 21, 26, 31, 36, etc. inches up the roof slope, as provided by the indicators 34 on the conventional shingle scale 30 of the tape 10. The opposite scale or side 32, with its indicators 36 beginning eleven inches from the first end 12 of the tape 10 and having a spacing of five and one half inches therebetween, would be used to mark the shingle edge course lines for dimensional shingles.

Figure 5:
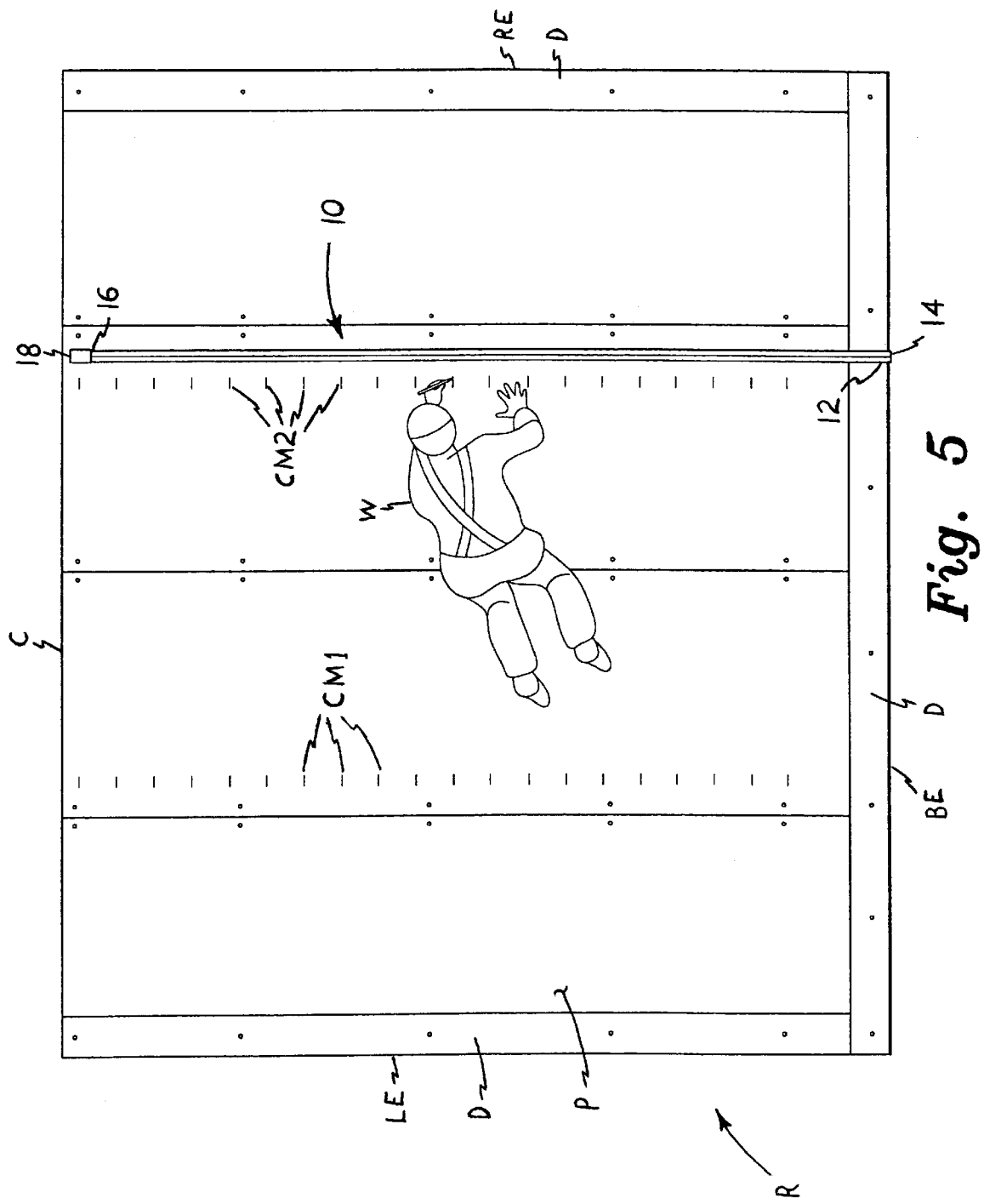
FIG. 5 is a top plan view similar to that of FIG. 4, showing the marking of a second series of shingle course line marks opposite the first series of FIG. 4.

When the first row of shingle edge course line marks CM1 has been laid out on the surface of the roof R, the worker W then transfers the tape 10 laterally across the roof surface to a line generally adjacent the opposite right side eaves RE, and repeats the procedure described above. This is illustrated in FIG. 5 of the drawings, with the second set of shingle edge course line markers CM2 also shown in FIG. 5. At this point, the worker W may connect the corresponding course line marks CM1 and CM2 using appropriate means (chalk line L, etc.), as shown in FIG. 7, or may proceed to lay out the shingle bonding line marks, as illustrated in FIG. 6 and described below.

Figure 6:
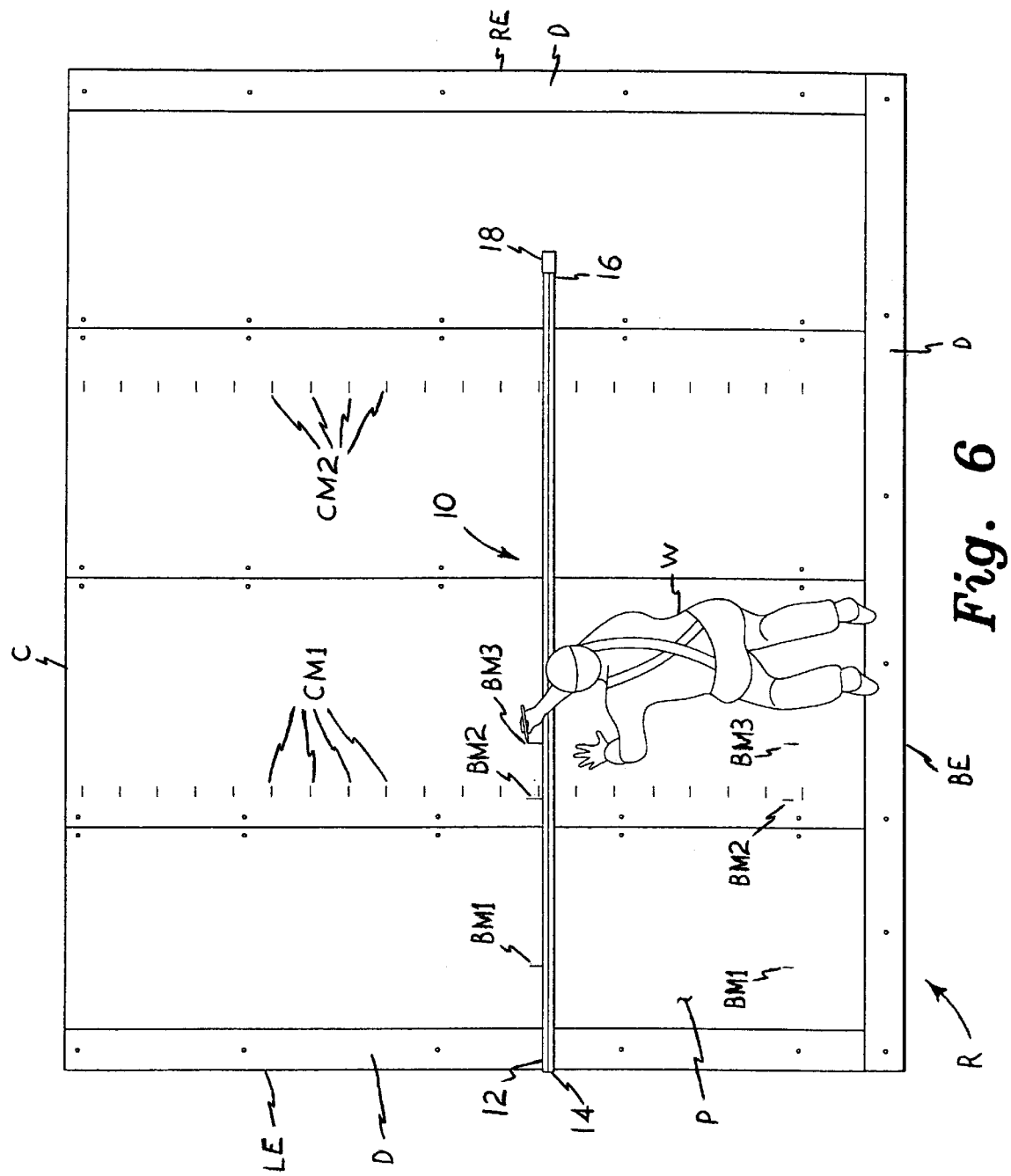
FIG. 6 is a top plan view of the roof surface of FIGS. 3 through 5, showing the use of the present roofing layout tape for marking a series of bond lines from the left eaves of the roof.

In FIG. 6, the worker W has turned the extended tape 10 by 90 degrees, with the catch 14 hooked over the flashing F of the left eaves LE and the tape 10 extended laterally across the roof R surface toward the right eaves RE. This orientation of the tape 10 provides for the marking of a series of bond line marks on the roofing paper surface P, with bond line marks BM1 through BM3 being applied in FIG. 6. It should be noted in FIG. 6 that a first set of identically spaced bond line marks BM1 through BM3 has already been applied to the roof R surface, closer to the bottom eaves BE. It should also be noted that the bond line marks extend a maximum of only 37¾ inches from either of the two lateral eaves LE or RE, even where larger dimensional or architectural shingles will be used. Accordingly, it is not necessary that the tape 10 be extended across the surface of the roof R to the length illustrated in FIG. 6 for marking the bond line locations.

Figure 7:
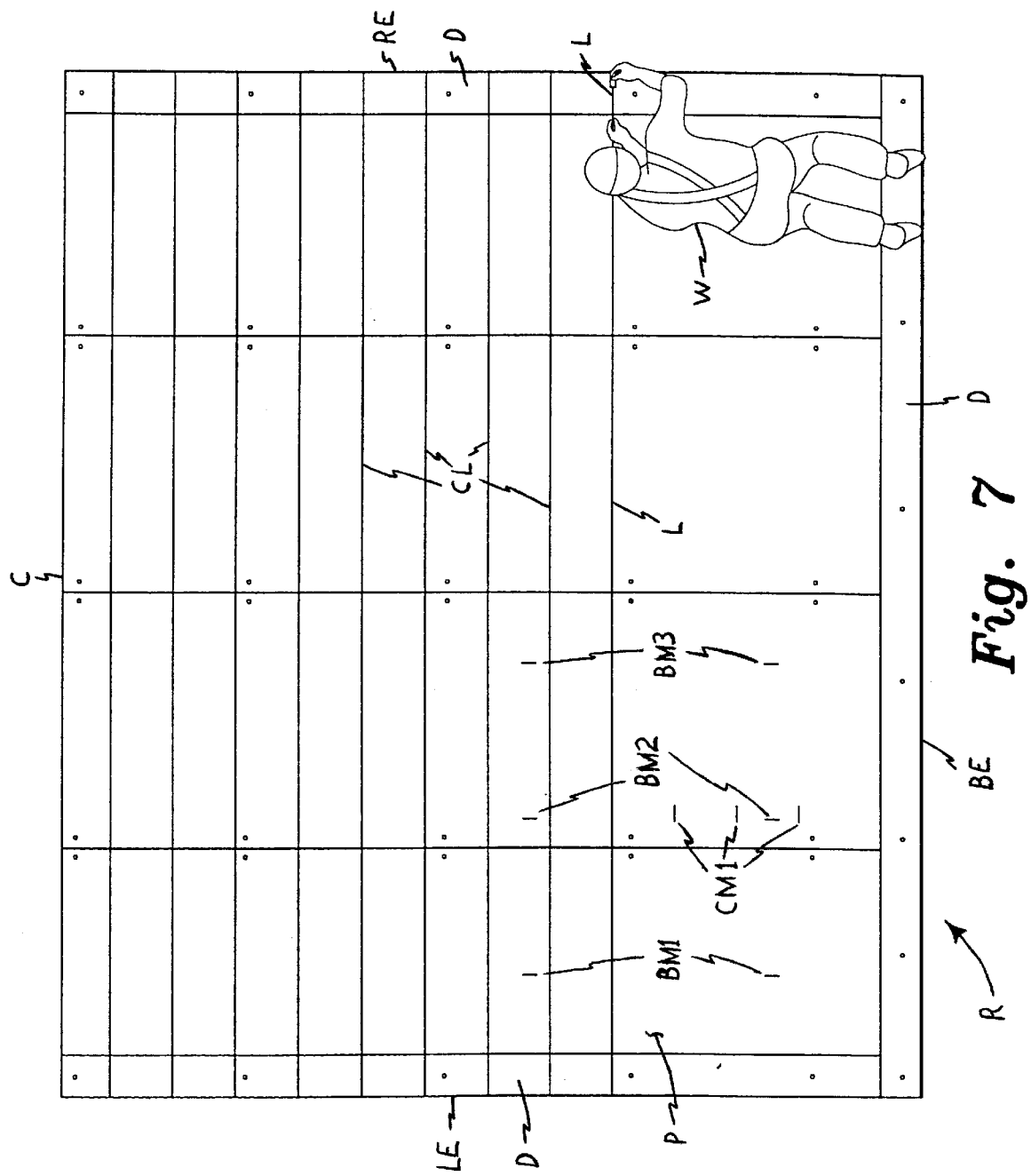
FIG. 7 is a top plan view of the roof surface of FIGS. 3 through 5, illustrating the marking of a series of shingle course lines horizontally across the roof surface, connecting the previously applied course line marks.
Figure 8:
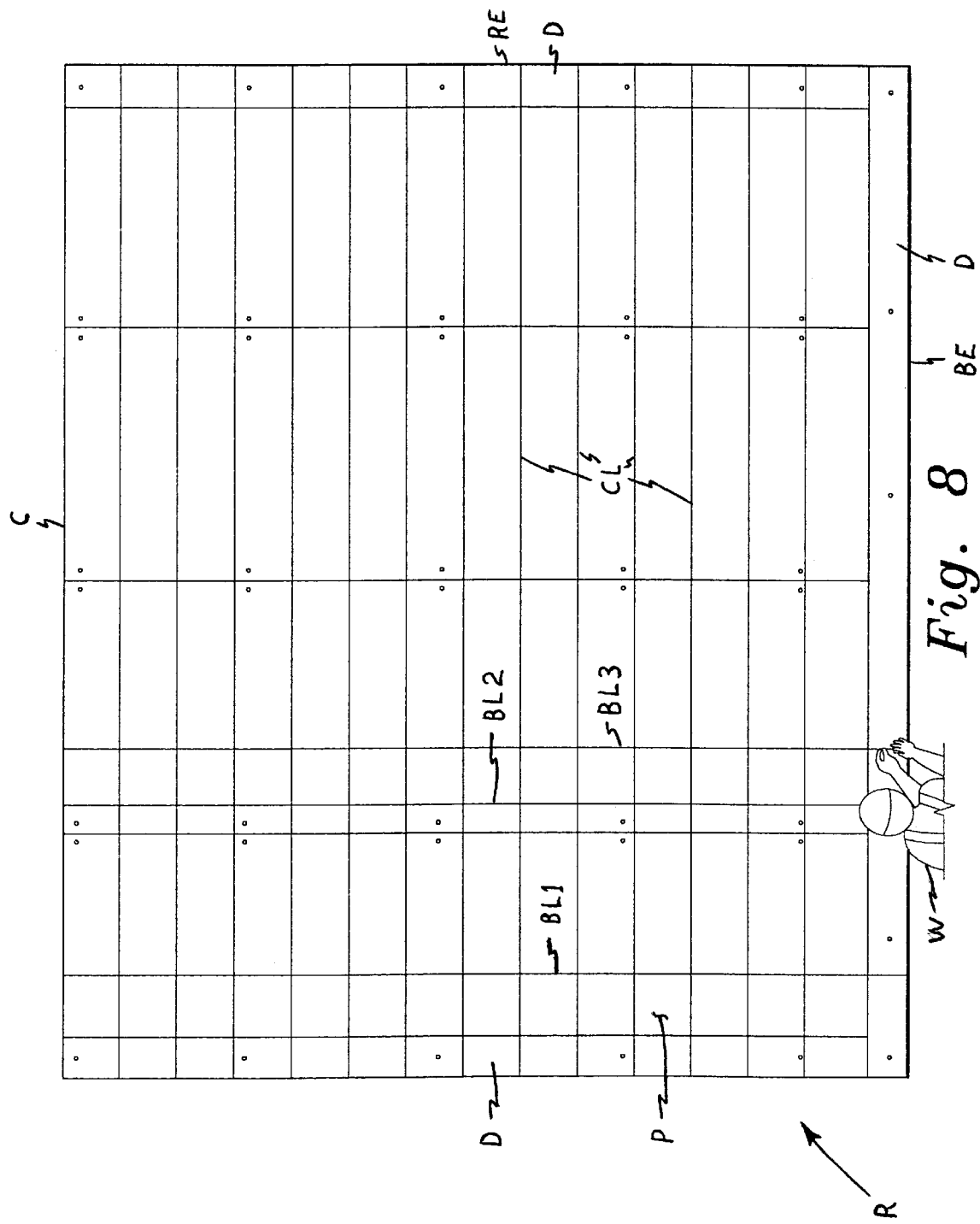
FIG. 8 is a top plan view of the roof surface of FIGS. 3 through 7, showing the interconnection of the previously marked bond marks to form a series of bond lines on the roof surface.

Once the bond line marks BM1 through BM3 have been applied to the surface of the roof R, in accordance with the circled bond marker positions 42 (for standard shingles) or 44 (for dimensional shingles) on the tape 10, the corresponding course marker lines CM1 and CM2 may be connected to form a horizontal array of shingle edge course alignment lines CL using a chalk line L or other suitable means, as shown in FIG. 7. The worker W then works orthogonally to the shingle course lines CL to mark the bond lines BL1 through BL3 with the chalk line L, as shown in FIG. 8. (An additional bond line, not shown, is preferably applied adjacent the right eaves RE for aligning the right hand eave row of shingles shown in FIG. 9.)

Figure 9:
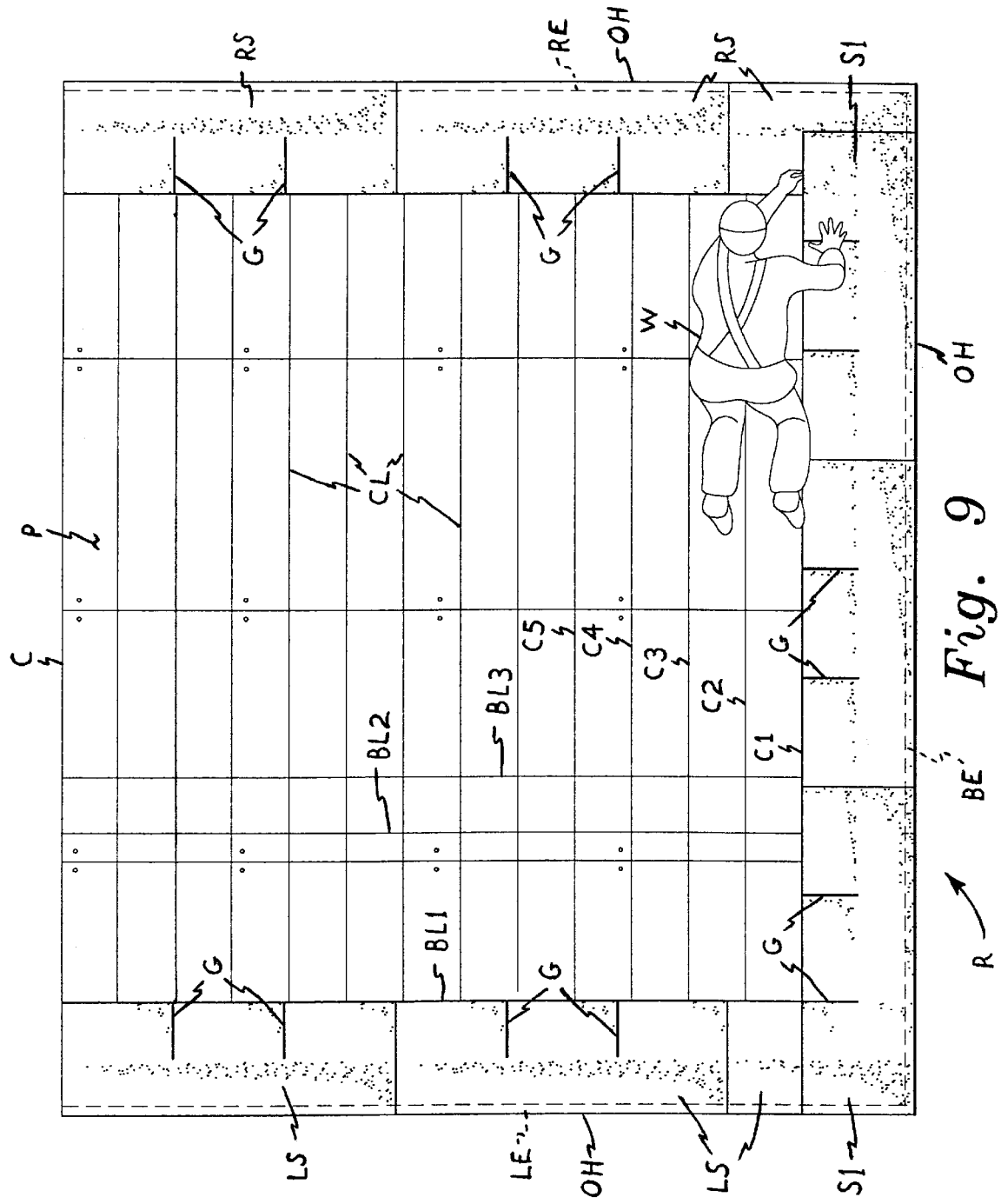
FIG. 9 is a top plan view of the roof surface of FIGS. 3 through 8, illustrating the completion of the application of a starter course of shingles aligned with the first course line, after previously applying optional lateral eaves shingles.

Once the layout lines CL and BL1 through BL3 have been marked on the surface of the roof R, as illustrated in FIGS. 3 through 8 of the drawings and described generally by the second step 102 of the flow chart of FIG. 11, the worker W may begin to install the shingles thereon, using the marks for alignment. The first few rows of installed shingles are illustrated in FIG. 9 of the drawings. The first two rows, designated as left lateral shingles LS and right lateral shingles RS, are installed along the respective left and right eves LE and RE, and serve as guides for cutting or trimming the remaining shingles extending from the conventional lateral shingle rows subsequently installed on the roof R. These shingles are turned around 180 degrees from their normal orientation, i.e., with their rain channels or grooves G directed inwardly toward the center of the roof R. This orientation is desired to provide the greatest unbroken peripheral edge for the left and right lateral shingles LS and RS, and as the final horizontal courses of shingles are installed atop these lateral shingles LS and RS, the rain grooves G are not needed.

The two lateral shingle rows LS and RS are positioned precisely by aligning their inboard edges with the previously applied first or outermost bond lines BL1. It was noted further above that the first bond marks BM1 are located eleven inches from the first end 12 of the tape 10. Conventional shingles have a width of twelve inches and dimensional shingles have a width on the order of 13¼ inches, as noted further above. However, only conventional shingles are used to form these starter rows along each of the eaves. This results in a conventional shingle overhang OH of one inch along the lateral eaves LE and RE when the inboard edges of the shingles LS and RS are aligned with the respective first bond line BL1 (shown in FIG. 8) and opposite second bond line (not shown), as shown in FIGS. 9 and 10 of the drawings. This is intentional, as the greater span or width of the shingles relative to the distance between the first bond marks 42 and the hook or catch 14 at the first end 12 of the tape 10, and the corresponding distance from the eaves to the first bond line BL1, results in a shingle overhang OH extending somewhat beyond the eaves. This is conventional in shingle installation, and precludes water runoff back under the outer peripheral edges of the shingles where it may run beneath seams in the underlying roofing paper P and penetrate the underlying roof sheathing.

Once the two lateral shingle rows or courses LS and RS are installed along the sloping left and right eaves LE and RE, a first or "starter" row or course of shingles, designated as shingle course S1, is installed along the lower or bottom eaves BE. The shingles of this first course are also turned 180 degrees, with their rain grooves C directed up the slope of the roof R, toward the ridge or crest C. This first course S1 is subsequently covered by a second course S2 which completely overlies (but is laterally staggered with) the first course S1, so the rain grooves are not needed for the first course S1. The unslotted peripheral edge of the first shingle course S1 provides a more rigid edge for the shingle installation.

It was noted further above that the first course marks 42 and 44 on the tape 10, are each located only eleven inches from the extreme first end 12 of the tape 10. The greater width of the shingles relative to the spacing of the course marks 42 and 44 from the first end 12 of the tape 10 (i.e., one inch greater for conventional shingles), results in the outermost edge of the shingle extending beyond the bottom eaves BE when the upper edge of the shingle is aligned along the first shingle course line C1, established by the first course mark on the tape 10 as described further above. This provides a shingle overhang OH at the lower or bottom eaves BE, just as was provided for the left and right lateral shingle rows LS and RS as described further above.

The first or starter row of shingles S1 is positioned laterally by aligning the right hand end with the third bond line B3, which is 35 inches (for conventional shingles) from the left hand eaves LE. With the one inch drip edge provided by the first bond line B1 for the left and right eaves shingles LS and RS, this results in the leftmost shingle of the starter row S1 overhanging the left eaves LE by precisely one inch, with the leftmost edge of that first starter row shingle being exactly aligned with the outer edge of the left eaves row of shingles LS. These dimensions are accurate for conventional shingles, with the locations of the bond lines established by the use of the dimensional or architectural bond marks 44 of the tape 10 resulting in a similar lateral positioning for such dimensional or architectural shingles.

Once the first or starter row S1 of shingles, with their reversed orientation, has been installed, the worker W installs a second row S2 with its upper and lower edges in exact registry with the corresponding edges of the starter row S1. This relationship is shown clearly in FIG. 10, with the second horizontal row of shingles S2, with their rain grooves G oriented away from the ridge or crest C of the roof R, extends nearly completely across the lower edge of the roof R. However, the extreme right end of this second row S2 is broken away, to show the underlying first or starter shingle row S1, with its reversed orientation and upwardly oriented rain channels or grooves G.

While the first and second horizontal rows of shingles S1 and S2 are aligned with one another relative to their upper and lower edges, they are staggered laterally with respect to one another, so that their ends are not directly aligned atop one another in order to preclude rain runoff passing between such laterally aligned shingles. This lateral staggering of horizontal shingle courses is conventional in the art, with the present layout tape 10 providing for such lateral staggering by means of the plurality of bond marks 42 or 44 (depending upon the shingle type) of the tape 10. The right hand end of the first shingle of the second horizontal course S2 is aligned with the second bond line BL2, with subsequent second course shingles being abutted end to end from the right end of the leftmost second row shingle S2.

This results in the second row shingles S2 being laterally staggered by six inches (the second and third bond marks are at 29 and 35 inches from the first end 12 of the tape 10), or in other words, the joints between second row shingles S2 is laterally offset by six inches from the underlying joints between the first or starter row of shingles S1. The difference between the first and second bond marks 44 of the scale 10, results in a similar staggering when dimensional shingles are used. It will be seen that this process may be used equally as well from the right hand eaves RE of the roof R, if so desired, by marking all three bond lines BL1 through BL3 relative to the right hand eaves RE, and working from right to left across the roof R.

Once the first two horizontal rows of shingles S1 and S2 have been installed, a third row S3 is installed. The third row S3 is staggered both vertically, i.e., up the slope of the roof R, and laterally or horizontally. The upper edge of each shingle of the row S3 is aligned with the horizontal course line C2, with the rightmost edge of the first shingle in the row or course being aligned with the third bond line B3. This results in a seven inch vertical overlap for each succeeding row of conventional shingles, due to the five inch difference between shingle course markers 34 along the tape 10. Thus, each succeeding course of shingles overlaps the next lower course by slightly more than half their widths, to assure full coverage.

The lateral stagger between the second and third shingle courses S2 and S3 is provided by the second and third bond lines BL2 and BL3, as illustrated in FIG. 9 of the drawings. As the difference between these two bond marks 44 on the tape 10 is six inches, the third row of shingles S3 is again staggered laterally by six inches relative to the underlying second row S2. This process is continued as subsequent rows of shingles are installed using their corresponding course alignment lines C3, C4, C5, etc., up the roof R toward the ridge or crest C, with the ends of the first shingles of each course being alternately aligned with either the second or third bond line BL2 or BL3 in order to stagger the shingles laterally back and forth by six inches for each course.

Once the shingles have been placed on the roof R, with a cap or ridge row installed to complete the job after the opposite side of the roof has been shingled, the finishing touches may be made. The overhanging shingles along the lateral eaves LE and RE are trimmed even with the overhang edges OH of the underlying left and right eaves rows of shingles LS and RS, generally as indicated by the fourth step 106 of the flow chart of FIG. 11, and any extraneous materials are removed from the job site, as indicated by the final step 108 of FIG. 11. The result is a precisely and accurately installed shingle installation, completed with minimal complication.

In conclusion, the present roofing layout tape provides a greatly improved and simplified means for the roofer to lay out the alignment pattern for shingles on a roof. Previous procedures for such layouts involved relatively cumbersome fractional calculations, wherein mistakes were easily made. Such mistakes in calculation result in uneven spacing between shingle courses, and/or uneven lateral stagger between courses. The results of such errors are at best unattractive, and at worst can result in roof leakage due to improperly staggered shingles, wind damage where the proper overlap was not provided, or other problems. Accordingly, the roofer would find it necessary to remove and replace some portion of the recently installed job, to correct such problems.

The present layout tape, with its marks for proper course and bond lines clearly marked on the tape, overcomes all of the various problems noted above. The present layout tape, with its clearly marked alignment indicators, enables a novice to accurately lay out a shingle pattern on a roof, with minimal time required and minimal chance for error. This is even more so when considering dimensional or architectural shingles, with their typical fractional dimensions. Accordingly, the present roofing layout tape will very quickly pay for itself in terms of time, effort, and materials saved in roofing work.

It is to be understood that the present invention is not limited to the embodiments described above, but encompasses any and all embodiments within the scope of the following claims.

We claim:

1. A roofing layout tape, comprising:
   an elongate, thin, flexible strip including a first end, a second end opposite said first end, a first surface, a second surface opposite said first surface, a first edge, and a second edge opposite said first edge;
   a first indicator side and a second indicator side, disposed upon said first surface respectively adjacent said first edge and said second edge of said strip;
   a conventional shingle layout indicator series linearly disposed along said first indicator side of said strip and extending from said first end to said second end of said strip; and
   a dimensional shingle layout indicator series linearly disposed along said second indicator side of said strip and extending from said first end to said second end of said strip;
   wherein said conventional shingle layout indicator series comprises a linear plurality of evenly spaced, conventional shingle course marks defining a plurality of conventional shingle upper edge alignment marks for properly overlapping a plurality of horizontally disposed conventional shingle courses; and
   said dimensional shingle layout indicator series comprises a linear plurality of evenly spaced, dimensional shingle course marks defining a plurality of dimensional shingle upper edge alignment marks for properly overlapping a plurality of horizontally disposed dimensional shingle courses.

2. The roofing layout tape according to claim 1, further including:
   a first color disposed along said conventional shingle layout indicator series;
   a second color disposed along said dimensional shingle layout indicator series; and
   said first color and said second color differing from one another for distinguishing said conventional shingle layout indicator series from said dimensional shingle layout indicator series.

3. The roofing layout tape according to claim 1, further including conventional linear measurement markings disposed upon said first surface of said strip.

4. The roofing layout tape according to claim 1, further including tape end grip means extending from said first end of said strip.

5. The roofing layout tape according to claim 1, further including a tape case having means for retractably storing said strip therein.

6. The roofing layout tape according to claim 1, wherein said strip is formed of material selected from the group consisting of steel, plastic, and fabric.

7. A roofing layout tape, comprising:
an elongate, thin, flexible strip including a first end, a second end opposite said first end, a first surface, a second surface opposite said first surface, a first edge, and a second edge opposite said first edge;
a first indicator side and a second indicator side, disposed upon said first surface respectively adjacent said first edge and said second edge of said strip;
a conventional shingle layout indicator series linearly disposed along said first indicator side of said strip and extending from said first end to said second end of said strip; and
a dimensional shingle layout indicator series linearly disposed along said second indicator side of said strip and extending from said first end to said second end of said strip;
wherein said conventional shingle layout indicator series includes a linear plurality of conventional shingle bond line marks defining a plurality of conventional shingle lateral edge alignment marks for properly laterally staggering a plurality of horizontally disposed conventional shingle courses; and
said dimensional shingle layout indicator series includes a linear plurality of dimensional shingle bond line marks defining a plurality of dimensional shingle lateral edge alignment marks for properly laterally staggering a plurality of horizontally disposed dimensional shingle courses.

8. The roofing layout tape according to claim 7, further including:
a first color disposed along said conventional shingle layout indicator series;
a second color disposed along said dimensional shingle layout indicator series; and
said first color and said second color differing from one another for distinguishing said conventional shingle layout indicator series from said dimensional shingle layout indicator series.

9. The roofing layout tape according to claim 7, further including conventional linear measurement markings disposed upon said first surface of said strip.

10. The roofing layout tape according to claim 7, further including tape end grip means extending from said first end of said strip.

11. The roofing layout tape according to claim 7, further including a tape case having means for retractably storing said strip therein.

12. The roofing layout tape according to claim 7, wherein said strip is formed of material selected from the group consisting of steel, plastic, and fabric.

13. A method for laying out a shingle installation pattern upon a sloped roof surface for the accurate installation of shingles thereon, comprising the steps of:
(a) providing an elongate, thin, flexible roofing layout tape including a first end, a second end opposite the first end, a first surface, a second surface opposite the first surface, a first edge, and a second edge opposite the first edge;
(b) defining a first indicator side and a second indicator side, disposed upon the first surface respectively adjacent the first edge and the second edge of the tape;
(c) applying a conventional shingle layout indicator series linearly disposed along the first indicator side of the tape and extending from the first end to the second end of the tape;
(d) further applying a dimensional shingle layout indicator series linearly disposed along the second indicator side of the tape and extending from the first end to the second end of the tape;
(e) extending the tape from the lower eaves to the ridge of the roof, adjacent a first one of the lateral eaves of the roof;
(f) marking the shingle courses adjacent the first of the lateral eaves according to the corresponding shingle layout indicator series of the tape, according to the type of shingles to be applied to the roof;
(g) extending the tape from the lower eaves to the ridge of the roof, adjacent the second one of the lateral eaves of the roof;
(h) marking the shingle courses adjacent the second of the lateral eaves according to the corresponding shingle layout indicator series of the tape, according to the type of shingles to be applied to the roof; and
(i) connecting the corresponding marks for the shingle courses across the roof, and forming a series of horizontal shingle edge course alignment lines.

14. The method for laying out a shingle installation pattern according to the method of claim 13, further including the steps of:
(a) applying a linear plurality of evenly spaced, conventional shingle bond line marks along the first side of the tape, defining a plurality of conventional shingle lateral edge alignment marks for properly laterally staggering a plurality of horizontally disposed conventional shingle courses; and
(b) further applying a linear plurality of evenly spaced, dimensional shingle bond line marks along the second side of the tape, defining a plurality of dimensional shingle lateral edge alignment marks for properly laterally staggering a plurality of horizontally disposed dimensional shingle courses.

15. The method for laying out a shingle installation pattern according to the method of claim 14, further including the steps of:
(a) extending the tape laterally from the first of the lateral eaves toward the second of the lateral eaves;
(b) marking a first series of shingle lateral edge alignment marks according to the corresponding shingle bond line marks of the tape, according to the type of shingles to be applied to the roof;
(c) connecting the corresponding first series of shingle lateral edge alignment marks, and forming a series of shingle edge course alignment lines orthogonal to the horizontally disposed shingle edge course alignment lines;
(d) extending the tape laterally from the second of the lateral eaves toward the first of the lateral eaves;
(e) marking second shingle lateral edge alignment marks according to a first one of the shingle bond line marks of the tape; and
(f) connecting the corresponding second shingle lateral edge alignment marks, and forming a single shingle edge course alignment line orthogonal to the horizontally disposed shingle edge course alignment lines.

16. The method for laying out a shingle installation pattern according to the method of claim 13, further including the steps of:
(a) providing a first color;
(b) further providing a second color distinct from the first color;

(c) applying the first color along the conventional shingle layout indicator series of the tape; and (d) applying the second color along the dimensional shingle layout indicator series of the tape.

17. The method for laying out a shingle installation pattern according to the method of claim 13, further including the step of providing conventional linear measurement markings disposed upon the first surface of the tape.

18. The method for laying out a shingle installation pattern according to the method of claim 13, further including the step of providing tape end grip means extending from the first end of the tape.

19. The method for laying out a shingle installation pattern according to the method of claim 13, further including the steps of:

(a) providing a tape case for the tape; and (b) further providing means for selectively retracting the tape into the case.

* * * * *